United States Patent [19]
Toyohara

[11] Patent Number: 5,933,270
[45] Date of Patent: Aug. 3, 1999

[54] OPTICAL EQUALIZER

[75] Inventor: Atsushi Toyohara, Tokyo, Japan

[73] Assignee: NEC Corporation, Tokyo, Japan

[21] Appl. No.: 08/986,590

[22] Filed: Dec. 8, 1997

[30] Foreign Application Priority Data

Dec. 6, 1996 [JP] Japan ................................ 8-326732

[51] Int. Cl.$^6$ ................ G02F 1/39; H01S 3/06; H04B 10/16

[52] U.S. Cl. .................... 359/341; 359/179; 359/337

[58] Field of Search .................... 359/161, 169, 359/170, 179, 194, 337, 341

[56] References Cited

U.S. PATENT DOCUMENTS

| | | | |
|---|---|---|---|
| 5,276,543 | 1/1994 | Olshansky | 359/124 |
| 5,392,154 | 2/1995 | Chang et al. | 359/241 |
| 5,519,796 | 5/1996 | Li et al. | 359/127 |
| 5,557,442 | 9/1996 | Huber | 359/179 |
| 5,636,054 | 6/1997 | Artigaud et al. | 359/341 |
| 5,636,301 | 6/1997 | O'Sullivan et al. | 385/24 |

OTHER PUBLICATIONS

Elrefavic et al, IEEE Photonics technology Lett., vol. 5, #9, pp. 1026–1026. abstract only herewith, Sep. 1993.

*Primary Examiner*—Nelson Moskowitz
*Attorney, Agent, or Firm*—Young & Thompson

[57] ABSTRACT

An optical equalizer for a wavelength-multiplexed optical communication system where an optical signal composed of a plurality of signal lights with different wavelengths is transmitted through an optical transmission line. The optical equalizer having: an optical coupler which has first to third ports where the optical signal to be input to the first port is output from the second port and the optical signal to be input to the second port is output from the third port; a wavelength division multiplexing type coupler which has at least one port and a plurality of ports where the one port is connected to the second port, the wavelength division multiplexing type coupler receiving the optical signal output from the second port, dividing the optical signal into the plurality of signal lights, outputting separately the signal lights to the plurality of ports, and coupling lights to be separately input to the plurality of ports to output to the one port; and a plurality of light-reflecting means which are separately connected to the plurality of ports of the wavelength division multiplexing type coupler.

6 Claims, 6 Drawing Sheets

OPTICAL EQUALIZER

FIELD OF THE INVENTION

This invention relates to an optical equalizer used in a wavelength-multiplexing optical communication system where signal lights with different wavelengths are propagated on an optical transmission line.

BACKGROUND OF THE INVENTION

Recently, wavelength-multiplexing optical communication systems, where signal lights with different wavelengths are propagated on an optical transmission line to increase quantity of information to be transmitted through the optical transmission line, are increasingly developed as means for realizing a large-capacity optical communication system.

In general, for a long-distance transmission, a variation of transmission level between channels occurs because of a wavelength dependency in transmission loss of the transmission line. Further, when multistage repeating is conducted by using some optical repeaters, a difference of transmission level between signal wavelengths occurs because of a wavelength dependency in the gain of the repeaters. Optical repeaters typically include an optical fiber amplifier. Therefore, the optical fiber amplifier needs to have an equalized wavelength dependency in its gain characteristic so as to conduct a desired optical transmission. Thus, in wavelength multiplexing optical transmission, the equalization of optical level is important.

Conventionally developed techniques for gain equalization of optical amplifier are as follows.

The first technique is a method of equalizing gain by using P/Al co-doped EDF (erbium doped fiber) and Al-doped EDF suggested in Kakui et al., "Hybrid EDFA(erbium doped fiber amplifier) Module for WDM(wavelength division multiplex) Transmission", Institute of Electrical Communication, Society Meeting, B-1094(1996). The second technique is providing a gain equalizer with an etalon filter in an optical amplifier as suggested in Okuno et al., "Optical Fiber Amplifier Module and Gain Equalizer for WDM Transmission", EDM96-42. The third technique is a method of equalizing gain by using fluoride-doped EDF suggested in Yamada et al., "Wide Band and Gain Equalized Type $Er^{3+}$-doped Fluoride Optical Fiber Amplifier", Institute of Electrical Communication, Electronics Society, C-221 (1995).

However, the first to third techniques for gain equalization have the problems described below.

Namely, the paper to suggest the first technique for gain equalization reports that a gain deviation of 1.5 dB is obtained. Thus, it does not meet a gain deviation of less than 1.0 dB which is desired in WDM transmission.

In the second technique for gain equalization, the theoretical gain deviation is controlled to be 0 dB and the paper reports that a gain deviation of less than 1.0 dB can be stably obtained. However, it cannot adjust a gain to a specific wavelength since the wavelength characteristic of the gain equalizer is fixed.

Also, in the third technique for gain equalization, a gain deviation of less than 1.0 dB is obtained. However, the reliability of a fluoride-doped EDF is so terrible as compared with that of a normal EDF. Therefore, it is not commercially available.

Meanwhile, all the first to third techniques are concerned only with an optical fiber amplifier. Thus, they cannot serve as a solution for the variation in transmission level between channels caused by a wavelength dependency in transmission lose of a transmission line in case of a long-distance transmission.

SUMMARY OF THE INVENTION

Accordingly, it is an object of the invention to provide an optical equalizer where a gain of arbitrary wavelength light in a wide range of wavelength band can be desirably adjusted.

It is a further object of the invention to provide an optical fiber amplifier employing such an optical equalizer.

It is a still further object of the invention to provide an optical transmission communication system employing such an optical equalizer.

According to the invention, provided is an optical equalizer used in a wavelength-multiplexed optical communication system where an optical signal composed of a plurality of signal lights with different wavelengths is transmitted through an optical transmission line, the optical equalizer receiving the optical signal with the plurality of signal lights, dividing the optical signal into the signal lights, adjusting separately the signal lights to have desired gains, and coupling the adjusted signal lights to output as a new optical signal.

According to another aspect of the invention, an optical equalizer used in a wavelength-multiplexed optical communication system where an optical signal composed of a plurality of signal lights with different wavelengths is transmitted through an optical transmission line, comprises:

an optical coupler which has first to third ports where the optical signal to be input to the first port is output from the second port and the optical signal to be input to the second port is output from the third port;

a wavelength division multiplexing type coupler which has at least one port and a plurality of ports where the one port is connected to the second port, the wavelength division multiplexing type coupler receiving the optical signal output from the second port, dividing the optical signal into the plurality of signal lights, outputting separately the signal lights to the plurality of ports, and coupling lights to be separately input to the plurality of ports to output to the one port; and a plurality of light-reflecting means which are separately connected to the plurality of ports of the wavelength division multiplexing type coupler.

According to a further aspect of the invention, an optical transmission communication system, comprises:

an optical equalizer disposed on an optical fiber transmission line;

wherein the optical equalizer is used in a wavelength-multiplexed optical communication system where an optical signal composed of a plurality of signal lights with different wavelengths is transmitted through an optical transmission line, the optical equalizer receiving the optical signal with the plurality of signal lights, dividing the optical signal into the signal lights, adjusting separately the signal lights to have desired gains, and coupling the adjusted signal lights to output as a new optical signal.

According to a further aspect of the invention, an optical transmission communication system, comprises:

an optical equalizer disposed on an optical fiber transmission line;

wherein the optical equalizer is used in a wavelength-multiplexed optical communication system where an optical signal composed of a plurality of signal lights with different wavelengths is transmitted through an optical transmission line, the optical equalizer comprising:

an optical coupler which has first to third ports where the optical signal to be input to the first port is output from the second port and the optical signal to be input to the second port is output from the third port;

a wavelength division multiplexing type coupler which has at least one port and a plurality of ports where the one port is connected to the second port, the wavelength division multiplexing type coupler receiving the optical signal output from the second port, dividing the optical signal into the plurality of signal lights, outputting separately the signal lights to the plurality of ports, and coupling lights to be separately input to the plurality of ports to output to the one port; and a plurality of light-reflecting means which are separately connected to the plurality of ports of the wavelength division multiplexing type coupler.

According to a further aspect of the invention, an optical fiber amplifier, comprises:

an optical equalizer which is used in a wavelength-multiplexed optical communication system where an optical signal composed of a plurality of signal lights with different wavelengths is transmitted through an optical transmission line, the optical equalizer receiving the optical signal with the plurality of signal lights, dividing the optical signal into the signal lights, adjusting separately the signal lights to have desired gains, and coupling the adjusted signal lights to output as a new optical signal.

According to a further aspect of the invention, an optical fiber amplifier, comprising:

an optical equalizer;

wherein the optical equalizer is used in a wavelength-multiplexed optical communication system where an optical signal composed of a plurality of signal lights with different wavelengths is transmitted through an optical transmission line, the optical equalizer comprising:

an optical coupler which has first to third ports where the optical signal to be input to the first port is output from the second port and the optical signal to be input to the second port is output from the third port;

a wavelength division multiplexing type coupler which has at least one port and a plurality of ports where the one port is connected to the second port, the wavelength division multiplexing type coupler receiving the optical signal output from the second port, dividing the optical signal into the plurality of signal lights, outputting separately the signal lights to the plurality of ports, and coupling lights to be separately input to the plurality of ports to output to the one port; and a plurality of light-reflecting means which are separately connected to the plurality of ports of the wavelength division multiplexing type coupler.

BRIEF DESCRIPTION OF THE DRAWINGS

The invention will be explained in more detail in conjunction with the appended drawings, wherein.

DESCRIPTION OF THE PREFERRED EMBODIMENTS

An optical equalizer in the first preferred embodiment will be explained in FIG. 1.

Figure 1:
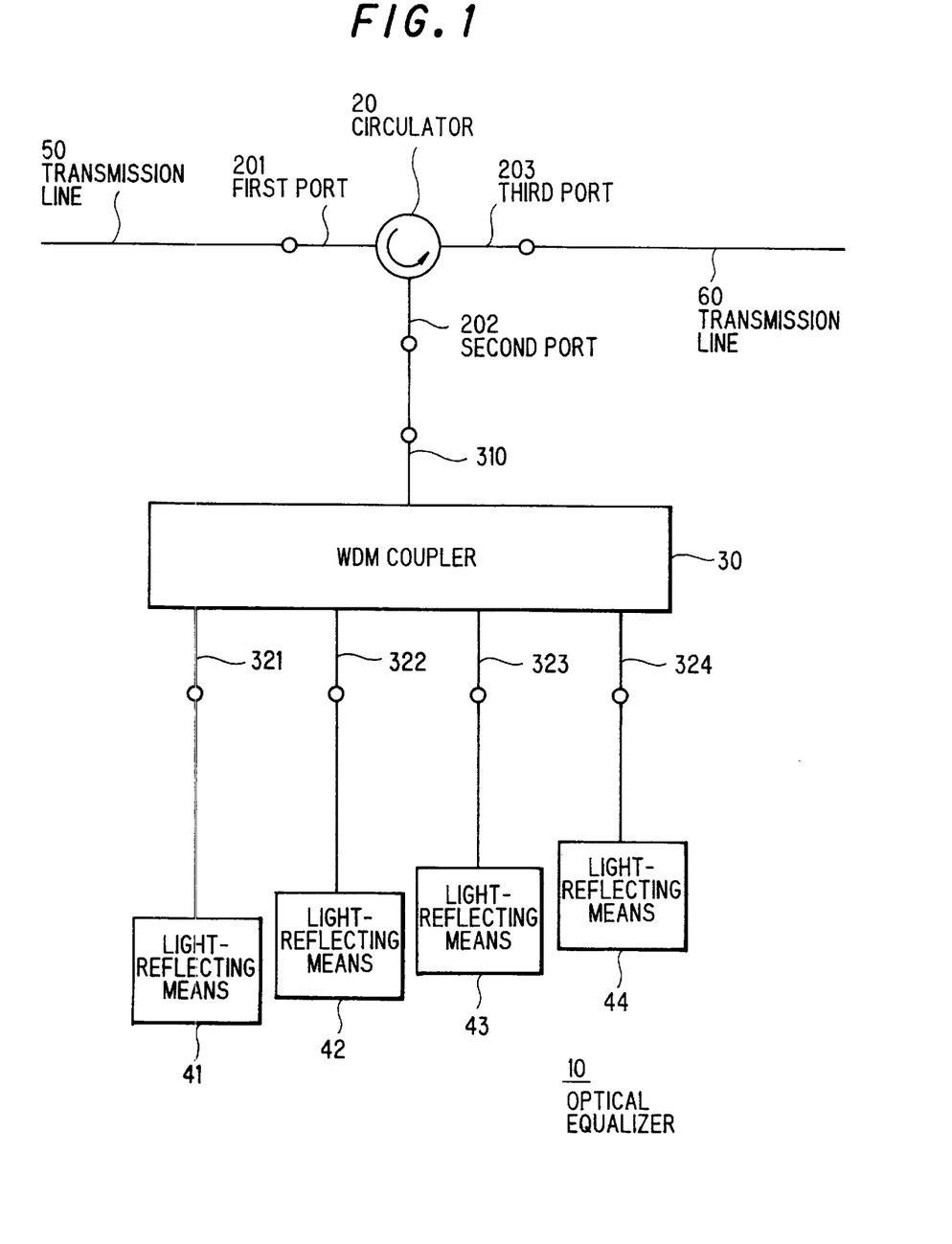
FIG. 1 is a block diagram showing an optical equalizer in a first preferred embodiment according to the invention.

In the first embodiment, an optical equalizer 10 is, as shown in FIG. 1, composed of a circulator 20 as an optical coupler, a wavelength division multiplexing transmission type coupler (hereinafter referred to as 'WDM coupler') 30, and first to fourth light-reflecting means 41 to 44.

In detail, the circulator 20 is composed of first to third ports 201 to 203. The first port 201 is optically connected to a transmission line 50, and the third port 203 is optically connected to a transmission line 60. Also, the second port 202 is optically connected to the WDM coupler 30.

The WDM coupler 30 has one port 310 which is optically connected to the second port 202 of the circulator 20 and first to fourth ports 321 to 324 which are optically connected to the first to fourth light-reflecting means 41 to 44, respectively. The WDM coupler 30 divides an optical signal input from the port 310 into signal lights with different wavelengths and outputs them to the first to fourth ports 321 to 324, and it combines signal lights output from the first to fourth ports 321 to 324 into one optical signal and outputs it to the port 310.

Figure 2:
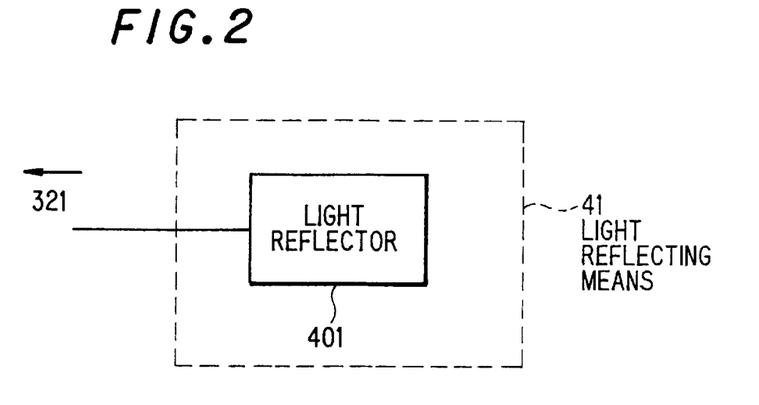
FIG. 2 is a block diagram showing a light-reflecting means in FIG. 1.

The first to fourth light-reflecting means 41 to 44 are optically connected to the first to fourth ports 321 to 324, respectively, of the WDM coupler 30. In the first embodiment, the first light-reflecting means 41 is, as shown in FIG. 2, provided with a light reflector 401, and the second to fourth light-reflecting means 42 to 44 are also provided with light reflectors 401.

In operation, a wavelength-multiplexed optical signal to be transmitted through the transmission line 50 is input to the first port 201 of the circulator 20 and then is output to the second port 202 of the circulator 20. Then, the optical signal output from the second port 202 of the circulator 20 is input to the port 310 of the WDM coupler 30, divided into signal lights with different wavelengths, then output to the first to fourth ports 321 to 324 of WDM coupler 30. Then, the signal lights output from the first to fourth ports 321 to 324 of WDM coupler 30 are reflected by the first to fourth light-reflecting means 41 to 44, respectively, then input again to the first to fourth ports 321 to 324 of WDM coupler 30, optically coupled and output from the 310 of the WDM coupler 30, then input to the second port 202 of the circulator 20, output from the third port 203 of the circulator 20 to the transmission line 60.

Meanwhile, in the first embodiment, the four light-reflecting means to be connected to the WDM coupler 30 are used. However, the invention is not limited to this embodiment, i.e., the number of the light-reflecting means can be optionally determined corresponding to the number of wavelengths included in the optical signal. This is equally applicable in the other embodiments described below.

An optical equalizer in the second preferred embodiment will be explained below.

Figure 3:
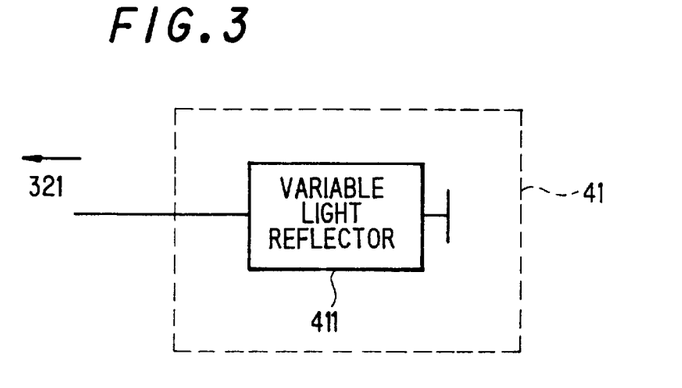
FIG. 3 is a block diagram showing a light-reflecting means in an optical equalizer in a second preferred embodiment according to the invention.

The second embodiment, which is a modification of the first embodiment, is characterized in the first to fourth light-reflecting means 41 to 44. Therefore, the explanations of the other components and their like operations are omitted.

As shown in FIG. 3, the first light-reflecting means 41 of the first to fourth light-reflecting means 41 to 44 by which the second embodiment is characterized is provided with a variable light reflector 411. Also, the second to fourth light-reflecting means 42 to 44 are similarly provided with light reflectors 411.

Thus, in the optical equalizer of the second embodiment composed as described above, the optical level can be separately adjusted when signal lights to be divided are reflected by the respective light-reflecting means.

An optical equalizer in the third preferred embodiment will be explained below.

Figure 4:
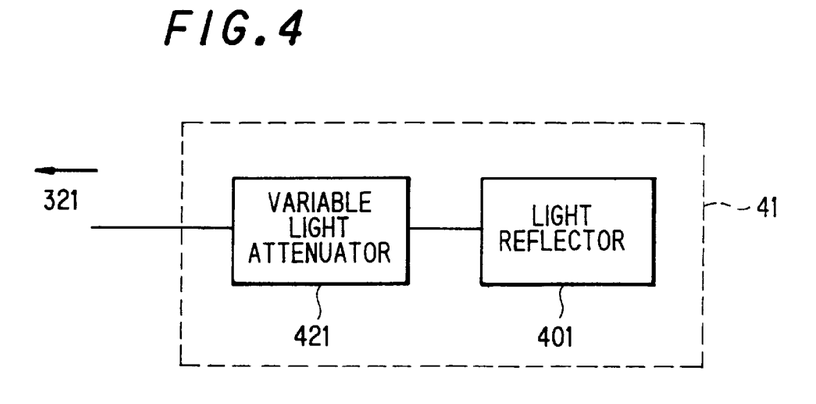
FIG. 4 is a block diagram showing a light-reflecting means in an optical equalizer in a third preferred embodiment according to the invention.

The third embodiment, which is a modification of the first embodiment, is characterized in the first to fourth light-reflecting means 41 to 44. Therefore, the explanations of the other components and their like operations are omitted.

As shown in FIG. 4, the first light-reflecting means 41 of the first to fourth light-reflecting means 41 to 44 by which the third embodiment is characterized is provided with a variable light attenuator 421 which is optically connected to the first port 321 of the WDM coupler 30 and a light reflector 401 which is optically connected to the variable light attenuator 421. Al so, the second to fourth light-reflecting means 42 to 44 are similarly provided with variable light attenuators 421 which are optically connected to the second to fourth port 322 to 324 of the WDM coupler 30 and light reflectors 401 which are optically connected to the variable light attenuators 421.

Thus, in the optical equalizer of the third embodiment composed as described above, the optical level can be separately adjusted like the second embodiment when signal lights to be divided are reflected by the respective light-reflecting means.

An optical equalizer in the fourth preferred embodiment will be explained below.

Figure 5:
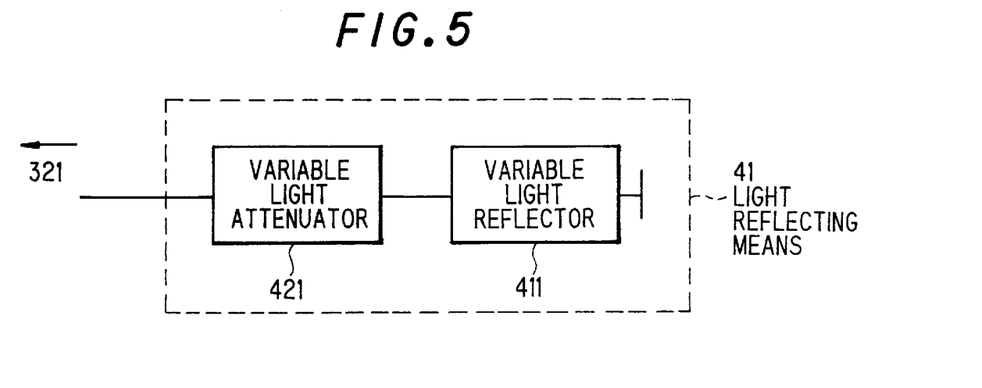
FIG. 5 is a block diagram showing a light-reflecting means in an optical equalizer in a fourth preferred embodiment according to the invention.

The fourth embodiment, which is a modification of the first embodiment, is characterized in the first to fourth light-reflecting means 41 to 44. Therefore, the explanations of the other components and their like operations are omitted.

As shown in FIG. 5, the first light-reflecting means 41 of the first to fourth light-reflecting means 41 to 44 by which the fourth embodiment is characterized is provided with a variable light attenuator 421 which is optically connected to the first port 321 of the WDM coupler 30 and a variable light reflector 411 which is optically connected to the variable light attenuator 421. Also, the second to fourth light-reflecting means 42 to 44 are similarly provided with variable light attenuators 421 which are optically connected to the second to fourth port 322 to 324 of the WDM coupler 30 and variable light reflectors 411 which are optically connected to the variable light attenuators 421.

Thus, in the optical equalizer of the fourth embodiment composed as described above, the optical level can be separately adjusted like the second embodiment when signal lights to be divided are reflected by the respective light-reflecting means.

An optical equalizer in the fifth preferred embodiment will be explained below.

Figure 6:
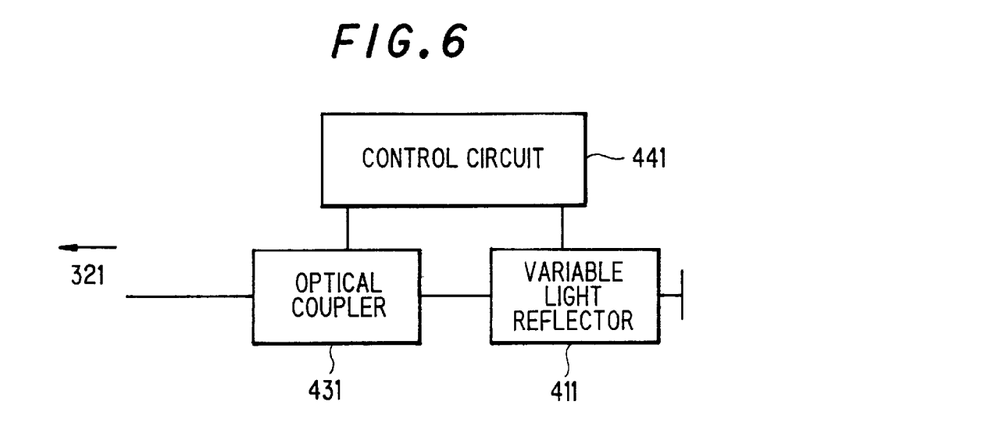
FIG. 6 is a block diagram showing a light-reflecting means in an optical equalizer in a fifth preferred embodiment according to the invention.

The fifth embodiment, which is a modification of the first embodiment, is characterized in the first to fourth light-reflecting means 41 to 44. Therefore, the explanations of the other components and their like operations are omitted.

As shown in FIG. 6, the first light-reflecting means 41 of the first to fourth light-reflecting means 41 to 44 by which the fifth embodiment is characterized is provided with a second optical coupler 431 which is optically connected to the first port 321 of the WDM coupler 30, a variable light reflector 411 which is optically connected to the second optical coupler 431, and a control circuit 441 which is connected with the second optical coupler 431 and variable light reflector 411. Also, the second to fourth light-reflecting means 42 to 44 are similarly provided with second optical couplers 431 which are optically connected to the second to fourth port 321 of the WDM coupler 30, variable light reflectors 411 which are optically connected to the second optical couplers 431, and control circuits 441 which are connected with the second optical couplers 431 and variable light reflectors 411.

Thus, in the optical equalizer of the fifth embodiment composed as described above, with respect to the first port 321, the control circuit 441 monitors the optical level of light divided by the second coupler 431 and controls the variable light reflector 411 according to the monitoring result. Also, with respect to the second to fourth ports 322 to 324, like controls are conducted. Therefore, by conducting the adjustment according to the optical level separately to the signal lights, the transmission levels to different wavelengths can always be equal.

Meanwhile, there are two control methods used in the control circuit 441. These two control methods will be explained concerning the first port 321. One control method is that the second coupler 431 divides light received from the first port 321 of the WDM coupler 30 into at least two lights and then the control circuit 441 receives one of the divided lights to monitor its optical level and controls the variable light adjustment of the variable light reflector 411 according to the monitoring result. The other control method is that the second coupler 431 divides light to be variably light-adjusted and then reflected by the variable light reflector 411 into at least two lights and then the control circuit 441 receives one of the divided lights to monitor its optical level and feedback-controls the variable light adjustment of the variable light reflector 411 according to the monitoring result.

In the former control method, the second optical coupler 431 serves to divide light received from the first port 321 of the WDM coupler 30 into at least two lights and output one of the divided lights to the variable light reflector 411 and the other of the divided lights to the control circuit 441, and serves to output light received from the variable light reflector 411 to the first port 321. In the latter control method, the second optical coupler 431 serves to output light received from the first port 321 to the variable light reflector 411 and divide the light received from the variable light reflector 411 into at least two lights, and serves to output one of the divided lights to the first port 321 and the other of the divided lights to the control circuit 441.

An optical equalizer in the sixth preferred embodiment will be explained below.

Figure 7:
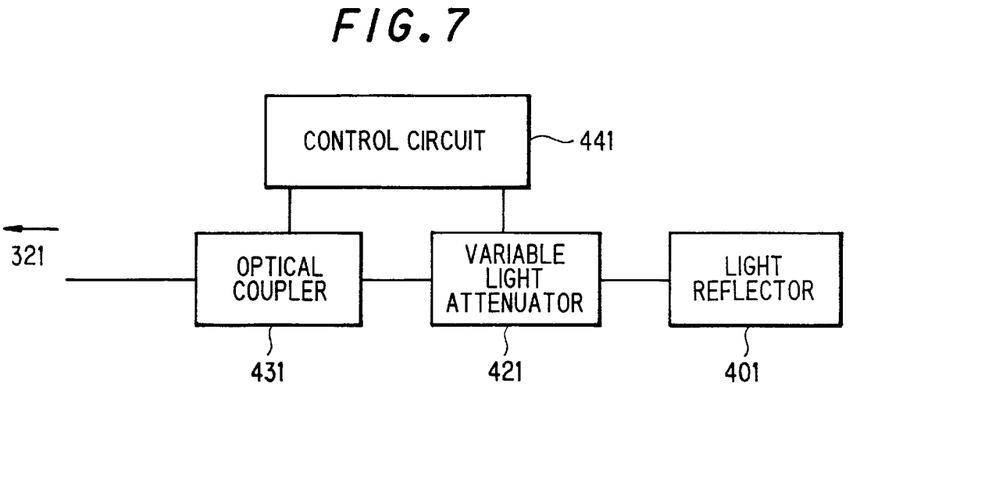
FIG. 7 is a block diagram showing a light-reflecting means in an optical equalizer in a sixth preferred embodiment according to the invention.

The sixth embodiment, which is a modification of the first embodiment, is characterized in the first to fourth light-reflecting means 41 to 44. Therefore, the explanations of the other components and their like operations are omitted.

As shown in FIG. 7, the first light-reflecting means 41 of the first to fourth light-reflecting means 41 to 44 by which the sixth embodiment is characterized is provided with a second optical coupler 431 which is optically connected to the first port 321 of the WDM coupler 30, a variable light attenuator 421 which is connected to the second optical coupler 431, a control circuit 441 which is connected with the second optical coupler 431 and variable light attenuator 421, and a light reflector 401 which is connected to the variable light attenuator 421. Also, the second to fourth light-reflecting means 42 to 44 are similarly provided with second optical couplers 431 which are optically connected to the second to fourth port 321 of the WDM coupler 30, variable light attenuators 421 which are connected to the second optical couplers 431, control circuits 441 which are connected with the second optical couplers 431 and variable light attenuators 421, and light reflectors 401 which are connected to the variable light attenuators 421.

Thus, in the optical equalizer of the sixth embodiment composed as described above, with respect to the first port 321, the control circuit 441 monitors the optical level of light divided by the second optical coupler 431 and controls the variable light attenuator 421 according to the monitoring result, and the signal light with an adjusted optical level is reflected by the light reflector 401. Also, with respect to the second to fourth ports 322 to 324, like controls are conducted. Therefore, by conducting the adjustment according to the optical level separately to the signal lights, the transmission levels to different wavelengths can always be equal.

Meanwhile, the variable light attenuator 421 can control the optical level before light is input to the light reflector 401 or after light is reflected by the light reflector 401. Typically, the optical level control is conducted both before and after the reflection by the light reflector 401.

On the other hand, there are two control methods used in the control circuit 441. These two control methods will be explained concerning the first port 321 One control method is that the second optical coupler 431 divides light received from the first port 321 of the WDM coupler 30 into at least two lights and then the control circuit 441 receives one of the divided lights to monitor its optical level and controls the variable light adjustment of the variable light attenuator 421 according to the monitoring result. The other control method is that the second optical coupler 431 divides light to be variably light-adjusted and then reflected by the variable light attenuator 421 into at least two lights and then the control circuit 441 receives one of the divided lights to monitor its optical level and feedback-controls the variable light adjustment of the variable light attenuator 421 according to the monitoring result.

In the former control method, the second optical coupler 431 serves to divide light received from the first port 321 of the WDM coupler 30 into at least two lights and output one of the divided lights to the variable light attenuator 421 and the other of the divided lights to the control circuit 441, and serves to output light received from the variable light attenuator 421 to the first port 321. In the latter control method, the second optical coupler 431 serves to output light received from the first port 321 to the variable light attenuator 421 and divide the light received from the variable light attenuator 421 into at least two lights, and serves to output one of the divided lights to the first port 321 and the other of the divided lights to the control circuit 441.

An optical equalizer in the seventh preferred embodiment will be explained below.

Figure 8:
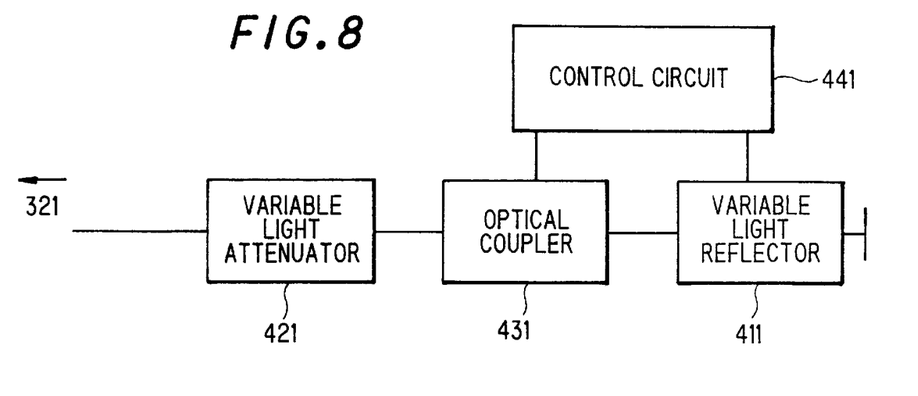
FIG. 8 is a block diagram showing a light-reflecting means in an optical equalizer in a seventh preferred embodiment according to the invention.

The seventh embodiment, which is a modification of the first embodiment, is characterized in the first to fourth light-reflecting means 41 to 44. Therefore, the explanations of the other components and their like operations are omitted.

As shown in FIG. 8, the first light-reflecting means 41 of the first to fourth light-reflecting means 41 to 44 by which the seventh embodiment is characterized is provided with a variable light attenuator 421 which is optically connected to the first port 321 of the WDM coupler 30, a second optical coupler 431 which is connected to the variable light attenuator 421, a variable light reflector 411 which is connected to the second optical coupler 431, and a control circuit 441 which is connected with the second optical coupler 431 and variable light reflector 411. Also, the second to fourth light-reflecting means 42 to 44 are similarly provided with variable light attenuators 421 which are optically connected to the second to fourth ports 322 to 324 of the WDM coupler 30, second optical couplers 431 which are connected to the variable light attenuators 421, variable light reflectors 411 which are connected to the second optical couplers 431, and control circuits 441 which are connected with the second optical couplers 431 and variable light reflectors 411.

Thus, in the optical equalizer of the seventh embodiment composed as described above, with respect to the first port 321, the control circuit 441 monitors the optical level of light divided by the second optical coupler 431 and controls the variable light reflector 411 according to the monitoring result. Also, with respect to the second to fourth ports 322 to 324, like controls are conducted. Therefore, by conducting the adjustment according to the optical level separately to the signal lights, the transmission levels to different wavelengths can always be equal.

Meanwhile, the variable light attenuator 421 can control the optical level before light is supplied to the second optical coupler 431 or before light is received from the second optical coupler 431. Typically, the optical level control is conducted both before light is supplied to the second optical coupler 431 and before light is received from the second optical coupler 431.

On the other hand, there are two control methods used in the control circuit 441. These two control methods will be explained concerning the first port 321. One control method is that the second optical coupler 431 divides light received through the variable light attenuator 421 from the first port 321 of the WDM coupler 30 into at least two lights and then the control circuit 441 receives one of the divided lights to monitor its optical level and controls the variable light adjustment of the variable light reflector 411 according to the monitoring result. The other control method is that the second optical coupler 431 divides light to be variably light-adjusted and then reflected by the variable light reflector 411 into at least two lights and then the control circuit 441 receives one of the divided lights to monitor its optical level and feedback-controls the variable light adjustment of the variable light reflector 411 according to the monitoring result.

In the former control method, the second optical coupler 431 serves to divide light received from the variable light attenuator 421 into at least two lights and output one of the divided lights to the variable light reflector 411 and the other of the divided lights to the control circuit 441, and serves to output light received from the variable light reflector 411 to the variable light attenuator 421. In the latter control method, the second optical coupler 431 serves to output light received from the variable light attenuator 421 to the variable light reflector 411 and divide the light received from the variable light reflector 411 into at least two lights, and serves to output one of the divided lights to the variable light attenuator 421 and the other of the divided lights to the control circuit 441.

An optical equalizer in the eighth preferred embodiment will be explained below.

Figure 9:
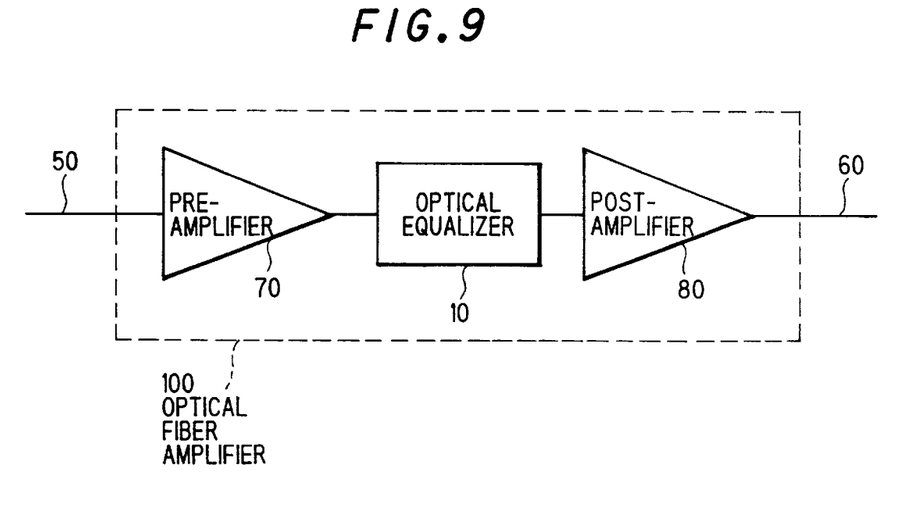
FIG. 9 is a block diagram showing an optical fiber amplifier in a eighth preferred embodiment according to the invention.

The eighth embodiment is an example where the optical equalizer 10 in the first embodiment is applied to an optical fiber amplifier 100. As shown in FIG. 9, the optical fiber amplifier 100 is composed a pre-amplifier 70 which is connected to the transmission line 50, the optical equalizer 10 which is connected to the pre-amplifier 70, and a post-amplifier 80 which is connected to the optical amplifier 10.

The optical fiber amplifier 100 thus composed allows spontaneous emission light which is generated in the optical fiber amplifier's amplification unit to be removed by the WDM coupler 30. In particular, spontaneous emission between channels can be suppressed. Therefore, the deterioration of signal-to-noise ratio can be prevented.

Meanwhile, in this embodiment, the optical equalizer 10 is disposed between the pre-amplifier 70 and the post-amplifier 80. However, the optical equalizer 10 may be disposed just after the output or just before the input of the optical fiber amplifier 100.

Also, in this embodiment, the optical equalizer in the first embodiment is used. However, the optical equalizer in either of the second to seventh embodiments may be used.

An optical equalizer in the ninth preferred embodiment will be explained below.

Figure 10:
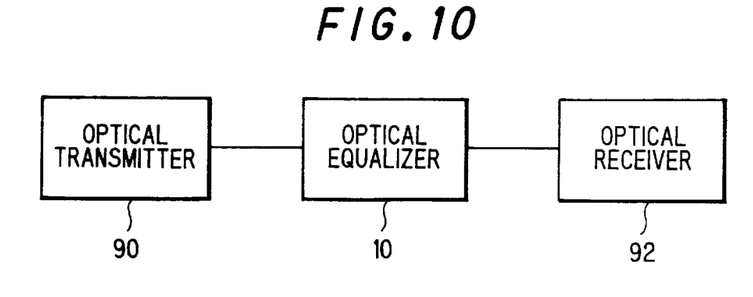
FIG. 10 is a block diagram showing an optical transmission communication system in a ninth preferred embodiment according to the invention.

The ninth embodiment is an example of an optical transmission system, where the optical equalizer 10 in the first embodiment is disposed in an optical transmission line. As shown in FIG. 10, the optical equalizer 10 is disposed between an optical transmitter 90 and an optical receiver 92.

In the optical transmission line thus composed, a variation of transmission level between channels due to a wavelength dependency in transmission loss of the transmission line can be adjusted. Thus, the optical levels of the respective channels can be equalized.

Meanwhile, in this embodiment, the optical equalizer in the first embodiment is used. However, the optical equalizer in either of the second to seventh embodiments may be used.

On the other hand, in the first to ninth embodiments, the optical circulator 20 is used as an optical coupler, which is connected with the transmission lines 50, 60 in the first to seventh embodiments, in the optical equalizer 10. The invention is not limited to the embodiments, i.e., any device which can conduct like operations may be used.

Also, the light-reflecting member of the light-reflecting means may be composed of, for example, a fiber grating, dielectric reflecting film or metal reflecting film. Here, the fiber grating is of an optical fiber, part of which is composed of a grating portion with periodically varied refractive indexes which has a function to attenuate(reflect) a specific wavelength.

The light-reflecting means with the dielectric reflecting film needs to have a low polarization dependency when light is obliquely supplied to the reflecting film, and a reduced light attenuation against the absorption of the reflecting film. Further it needs to have a controlled film thickness in fabrication since the performance is determined by the thickness of the reflecting film.

Further, the light-reflecting means with the metal reflecting member does not need to have a controlled film thickness in fabrication, whereby the fabrication can be simplified. It has a high polarization dependency when light is obliquely supplied to the reflecting film and is subject to a light attenuation since part of light is absorbed converting into heat in the reflecting film when reflecting.

In these light-reflecting means, the adjustment of reflection factor and optical level can be conducted by using a conventional technique, for example, by obliquely supplying light to the reflecting film in case of the dielectric reflecting film, according to the respective light-reflecting means.

The WDM coupler may be composed of, for example, a quartz waveguide, a quartz waveguide type AWG (array waveguide grating). Here, the quartz waveguide type AWG (or simply referred to as 'AWG') is a device where several waveguides with different lengths are formed on a quartz substrate to couple and divide lights with different wavelengths. The WDM coupler composed of the quartz waveguide can be relatively easily fabricated. However, one quartz waveguide can only divide one coupled wave into two waves (or, on the contrary, only couple two waves). Therefore, the number of pieces is increased, thereby causing difficulty in the fabrication and the dimensions of the device are increased. On the other hand, the quartz waveguide type AWG is integrated, thereby decreasing the number of pieces, but it is costly. Thus, either type of the WDM coupler may be optionally used.

In the first to ninth embodiments, the optical equalizer is composed of the circulator used as an optical coupler, the WDM coupler and the light-reflecting means. However, according to the invention, another embodiment as described below may be also employed.

Namely, an optical equalizer in another embodiment is composed of an optical signal dividing means which receives an optical signal (composed of signal lights with different wavelengths) to be propagated through the transmission line and divides it into signal lights, a signal gain adjusting means which receives the signal lights divided by the optical signal dividing means and adjusts the respective signal lights to have desired gains, and an optical signal coupling means which couples the signal lights adjusted by the signal gain adjusting means to output them as a new optical signal. For example, the optical signal dividing means and optical signal coupling means are a WDM coupler to be connected with the transmission lines, and the signal gain adjusting means is a variable light attenuator which is disposed between the optical signal dividing means and the optical signal coupling means for each wavelength (each signal light).

Next, a detailed example to facilitate the understanding of the invention will be explained in FIGS. 11 to 13.

Figure 11:
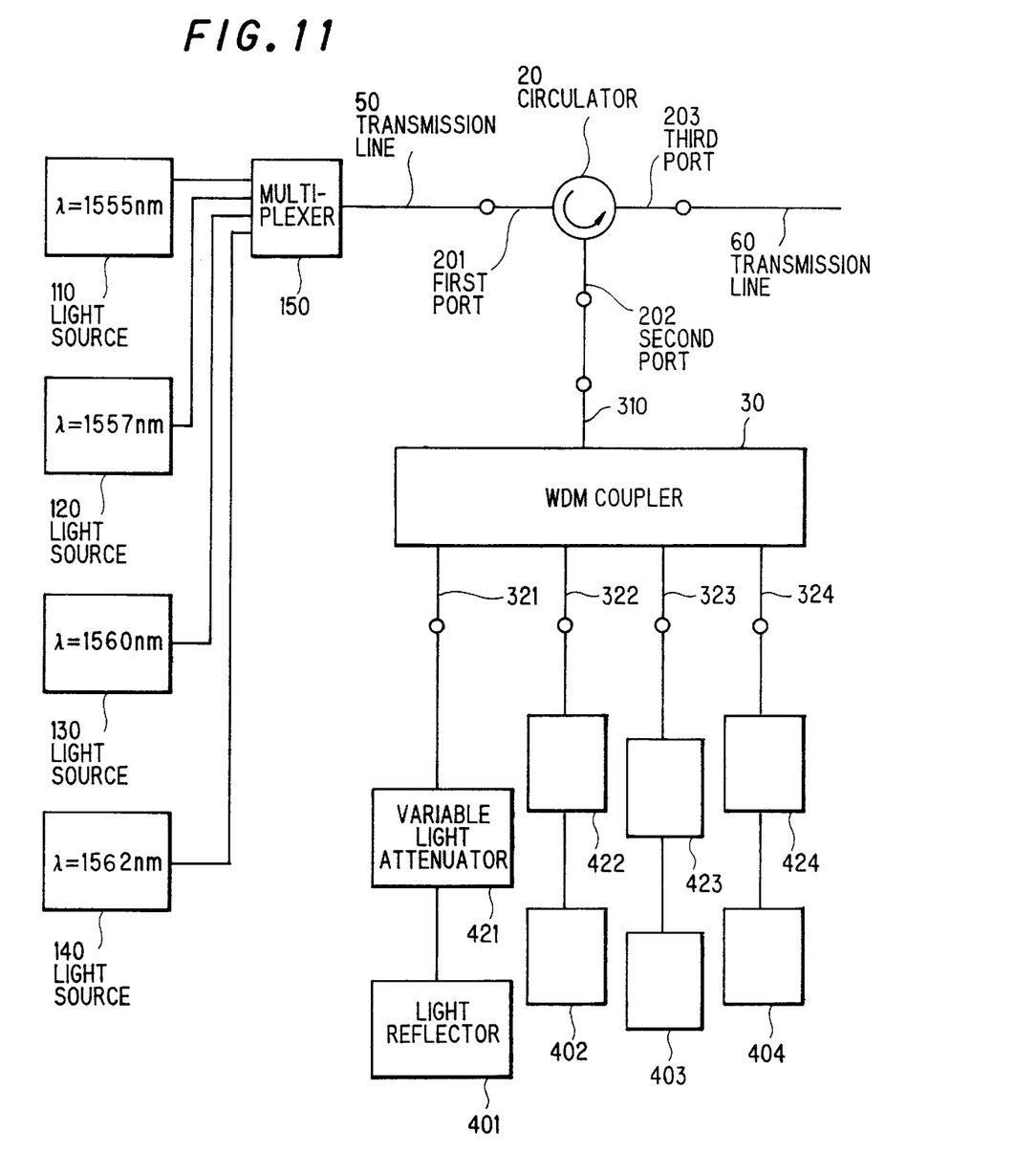
FIG. 11 is a block diagram showing a detailed example of the optical transmission communication system in FIG. 10.

In this example, an optical transmission communication system is, as shown in FIG. 11, composed of first to fourth light sources 110 to 140, a multiplexer 150, transmission lines 50, 60, a circulator 20, a WDM coupler 30, first to fourth variable light attenuators 421 to 424, and first to fourth light reflectors 401 to 404.

The circulator 20, WDM coupler 30, first to fourth variable light attenuators 421 to 424 and first to fourth light reflectors 401 to 404 compose the optical equalizer in the fourth embodiment.

The first to fourth light sources 110 to 140 serve to output signal lights with different wavelengths. The first light source 110 outputs first signal light with a wavelength of 1555 nm, the second light source 120 outputs second signal light with a wavelength of 1557 nm, the third light source 130 outputs third signal light with a wavelength of 1560 nm, and the fourth light source 140 outputs fourth signal light with a wavelength of 1562 nm.

The multiplexer 150 multiplexes the first to fourth signal lights with the different wavelengths to be output from the first to fourth light sources 110 to 140, and then outputs one multiplexed optical signal to the transmission line 50.

The optical signal transmitted through the transmission line 50 is input to the first port 201 of the circulator 20, then output to a port 310 of the WDM coupler 30 from the second port 202 of the circulator 20.

In this example, the WDM coupler 30 is composed of a quartz waveguide type AWG(array waveguide grating) and is provided with the port 310 and first to fourth ports 321 to 324.

The optical signal input to the port 310 is divided into the first to fourth signal lights corresponding to the respective wavelengths by the WDM coupler 30, and the divided signal lights are separately output from the first to fourth ports 321 to 324.

The first signal light output from the first port 321 is reflected through the first variable light attenuator 421 by the first light reflector 401, which is composed of metal film with a reflection factor of 99.99%, and then is again input through the first light attenuator 421 to the first port 321 of the WDM coupler 30. Like the first signal light, the second to fourth signal lights separately are passed through the second to fourth light attenuators 422 to 424, reflected by the second to fourth light reflectors 402 to 404, then input to the second to fourth ports 322 to 324 of the WDM coupler 30.

Then, the first to fourth signal lights input to the first to fourth ports 321 to 324 of the WDM coupler 30 are multiplexed, then output from the port 310 to the second port 202 of the circulator 20, further output from the third port 203 of the circulator 20 to the transmission line 60.

Figure 12:
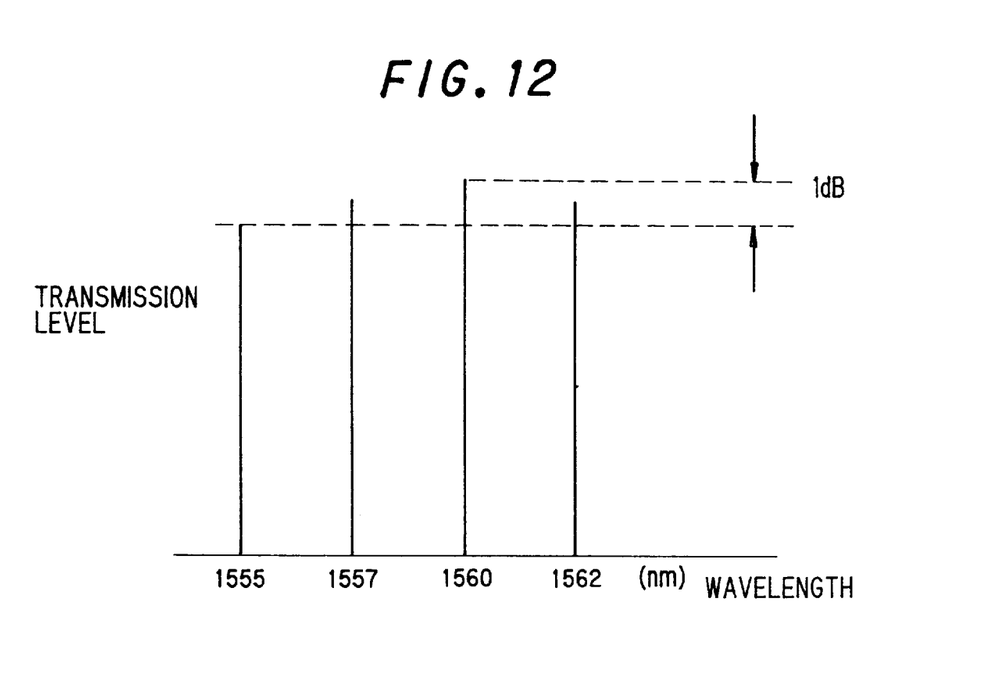
FIG. 12 is an illustration showing optical transmission levels in the optical transmission communication system in FIG. 11 when all variable light attenuators have the same variable light setting.
Figure 13:
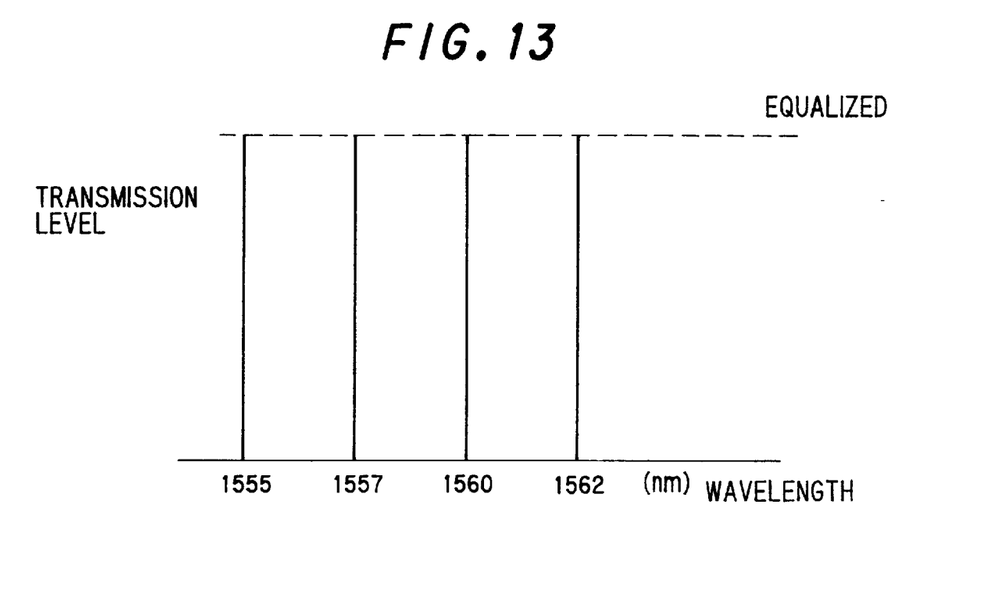
FIG. 13 is an illustration showing optical transmission levels in the optical transmission communication system in FIG. 11 when the variable light attenuators have separate variable light setting.

In this optical transmission communication system thus composed, when all the first to fourth variable light attenuators 421 to 424 have the same variable light setting, the dispersion of transmission levels between the signal lights is about 1 dB at maximum, as shown in FIG. 12. However, by adjusting separately the first to fourth variable light attenuators 421 to 424, the transmission levels between the signal lights can be equalized to have a dispersion of 0 dB, as shown in FIG. 13. Thus, the transmission qualities of the respective wavelengths can be equalized.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical signal equalizing system for an optical transmission line carrying a wavelength division multiplexed (WDM) optical signal, said system comprising:

an optical signal equalizer circuit for equalizing signal levels of optical signals of different wavelengths in the WDM optical signal;

an optical circulator having three ports, a first of said ports for being optically connected to the transmission line for receiving the WDM optical signal therefrom, a second of said ports optically connected to said optical signal equalizer circuit for sending the received WDM optical signal thereto and receiving an equalized WDM optical signal therefrom, and a third of said ports for being optically connected to the transmission line for sending the equalized WDM optical signal thereto; and said optical signal equalizer circuit comprising, an optical wavelength division multiplexer/demultiplexer optically connected to said circulator for separating the received WDM optical signal into the optical signals of different wavelengths and for combining equalized versions of the optical signals of different wavelengths into an equalized WDM optical signal, said multiplexer/demultiplexer having plural input/output ports, and plural equalization circuits which are each connected to a different one of said input/output ports of said multiplexer/demultiplexer, each of said equalization circuits for adjusting a signal level of a different one of the optical signals of different wavelengths so that all of the respective signal levels are equal, each of said plural equalization circuits comprising a control circuit for monitoring the signal level of the respective one of the optical signals of different wavelength and at least one of a light attenuator and a light reflector for varying the signal level in response to said control circuit so that all of the signal levels are equal.

2. The system of claim 1, wherein each of plural equalization circuits further comprises an optical coupler connected to a respective one of said input/output ports of said multiplexer/demultiplexer for splitting the respective one of the optical signals of different wavelength, the split signals being provided to said control circuit and to said one of a light attenuator and a light reflector.

3. The system of claim 2, wherein each of said equalization circuits comprises said light attenuator which is connected to said control circuit and wherein said optical coupler is optically connected to said light attenuator.

4. The system of claim 3, wherein each of said equalization circuits further comprises said light reflector which is optically connected to said light attenuator.

5. The system of claim 2, wherein each of said equalization circuits comprises said light reflector which is connected to said control circuit and wherein said optical coupler is optically connected to said light reflector.

6. The system of claim 5, wherein each of said equalization circuits further comprises said light attenuator which is optically connected to said optical coupler and to the respective one of said input/output ports.

* * * * *